United States Patent Office 3,525,211
Patented Aug. 25, 1970

3,525,211
CONTROL DEVICE FOR TIMEPIECE MECHANISM
Rodolphe Wyssen, Geneva, Switzerland, assignor to Boninchi S.A. Fabrique de Couronnes de Montres, Geneva, Switzerland, a Swiss company
Filed June 21, 1968, Ser. No. 738,959
Claims priority, application Switzerland, June 28, 1967, 9,183/67
Int. Cl. G04b 37/08
U.S. Cl. 58—90                                    4 Claims

ABSTRACT OF THE DISCLOSURE

In a control device for a timepiece mechanism housed in a casing and having a rod passing through one wall of the casing and capable of occupying two axial positions, one for winding and the other for setting, and a control member with means for rotating this member and the rod, a fluid tight packing axially compressed by this member when the rod is in winding position, the control member is slidingly mounted on the rod and is subjected to the urging of two oppositely acting elastic elements, one of these elements being the fluid tight packing.

---

This invention relates to a control device for a timepiece mechanism.

There are already known control devices for timepiece mechanisms in which the control member, in particular the winding button, axially compresses a packing joint when it is in its axial position nearest the casing, which corresponds to the winding position. This compression has for its purpose to increase the fluid tightness of the control device, when the same is in its normal position.

It has however been observed that the joint thus compressed deteriorates more rapidly owing to the turning of the winding button. Additionally, the frictional force created by the pressure of the joint on the button renders more difficult the winding operation.

It has been proposed to remedy this drawback by the use of buttons screwed on the pendant in inoperative position and then compressing the fluid tight joint. The button must be unscrewed so as to be brought in winding or setting position. These constructions are relatively complex and expensive mainly because the control member must be uncoupled from the stem during screwing of the button.

The present invention proposes a construction which makes it possible to avoid the previously mentioned disadvantages.

It consequently has for its object a control device for a timepiece mechanism housed in a casing, and comprising a stem passing through one wall of the casing and able to occupy two axial positions, one for winding and the other one for setting, a control member, means for rotatably coupling this member and the stem, and a fluid tight joint axially compressed by this member when the stem is in winding position. This device is characterized by the fact that said member is slidably mounted on said stem and is subjected to the urging of two opposite elastic elements, one of said elements being the said joint.

The device according to the present invention has the advantage of a compression of the joint by the button, obtained through the intermediary of an elastic element permitting to the control member to move axially relative to the stem.

The accompanying drawing represents by way of example two modifications of the present invention.

Figure 1:
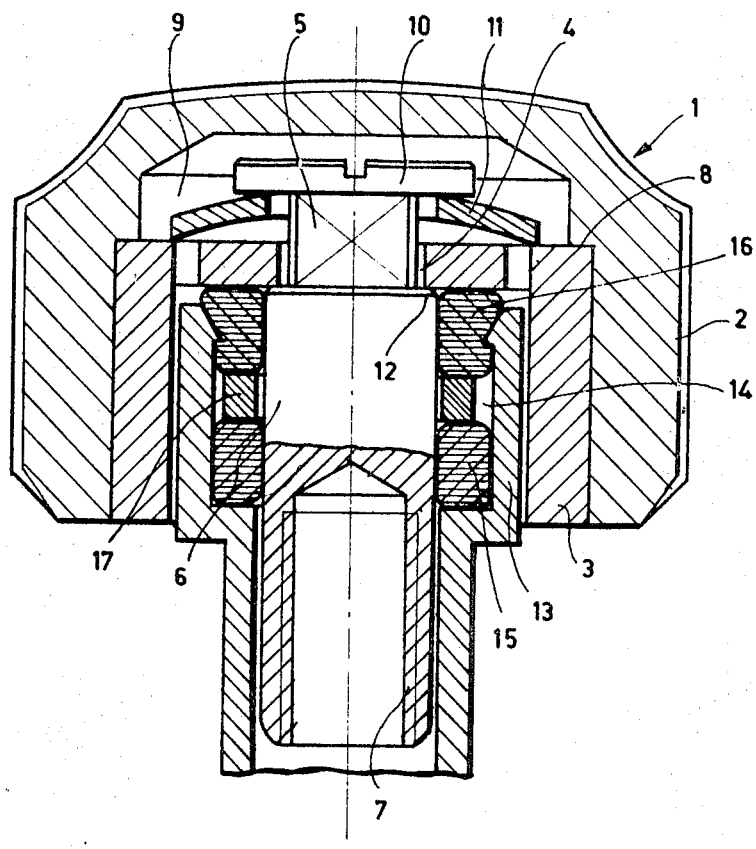
FIGS. 1 and 2 are cross sections of a device according to the first embodiment illustrating this device in winding and setting position respectively.
Figure 2:
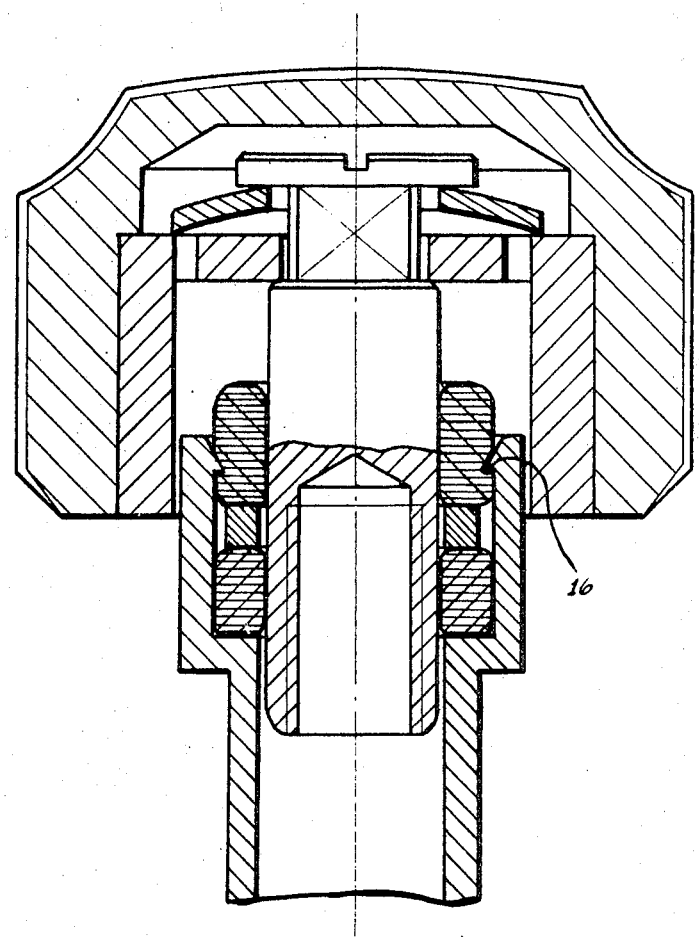

The device shown in FIGS. 1 and 2 comprises a control member 1 which consists of a winding button 2 inside of which is driven a tube 3 whose bottom has an axial opening 4 intended for the passage of the outer segment 5 of a rod 6 which has an inner threading 7 intended for the fastening of the winding stem. Opening 4 of tube 3 and the extremity 5 of rod 6 have both a polygonal section forming means for rotatably coupling button 2 with the winding stem.

Tube 3 rests against a shoulder 8 of the button in order to form a housing 9 between the bottom of this tube and that of the winding button. The end 5 of rod 6 projects inside this housing. The head 10 of the screw fixed axially to the outer end of rod 6 forms a shoulder against which bears the inner edge of an annular spring 11, whose outer edge rests against the bottom of tube 3. The convex shape of this spring causes tube 3 to bear against a shoulder 12 of rod 6.

The cylindrical part of tube 3 is mounted around tube 13 whose lower part is driven into an opening in the lateral wall of the casing. The outer part of this tube forms, with the rod 6 an annular housing 14. Two annular joints of elastically compressible material 15 and 16 spaced by a metallic ring 17 are housed in housing 14.

As shown in FIG. 2 the upper joint 16 projects in its uncompressed state outside tube 13. The two joints 15 and 16 are radially compressed between tube 13 and rod 6. Additionally, axial pressure is transmitted to joint 15 during introduction of joint 16 in housing 14 by the intermediary of metallic ring 17.

Figure 3:
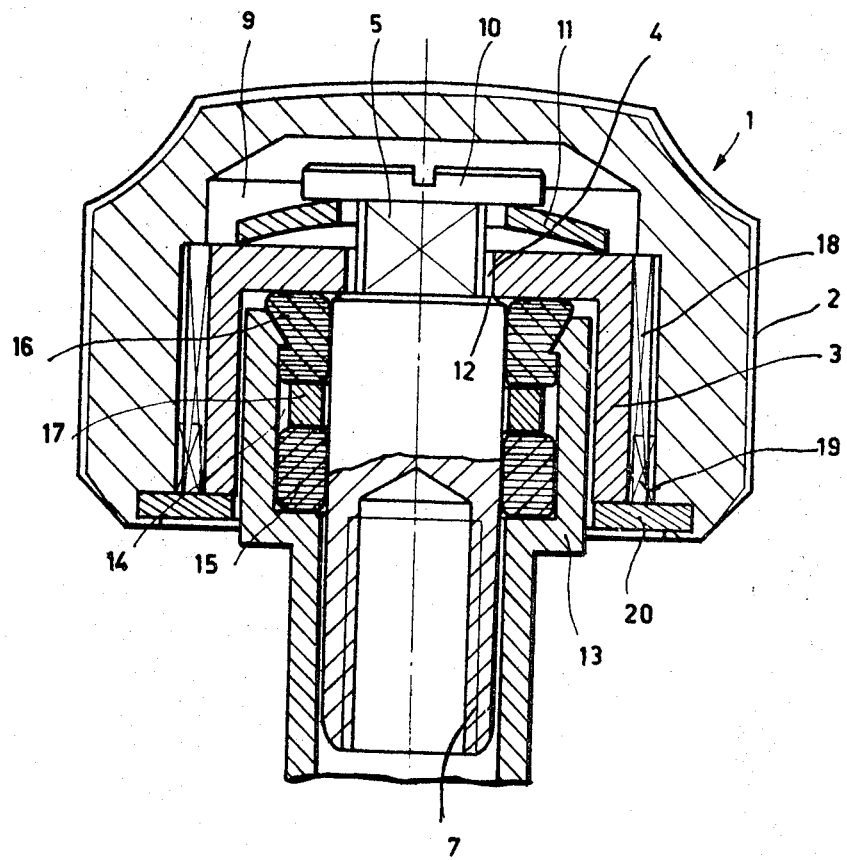
FIG. 3 is a cross section showing a modification.

The modification shown in FIG. 3 differs from the previous embodiment by the fact that tube 3 has flutes 18 on its outer lateral surface cooperating with flutes 19 on button 2. A metallic ring 20 rivetted on button 2 maintains tube 3 inside the button.

The control member 1 is habitually in the position shown in FIG. 1 which corresponds to the winding position. It is in this position that the optimum fluid tightness is obtained by compression of joint 16 by the bottom of tube 3. The winding button is maintained in this axial position by the setting lever and the jumper spring of the winding mechanism of the timepiece, which are not shown in the drawing. The bottom of this tube presses against joint 16 through spring 11. Since tube 3 is slidably mounted on the end 5 of rod 6 control member 1 can move axially against the force exerted by spring 11. The pressure of this spring is selected in such a way as to maintain the control member in the position in FIG. 1 while however allowing this control member to move back slightly while it rotates during winding. The compression of joint 16 by spring 11 renders more facile the turning of the control member and lessens wear of the joint. In effect when the wearer winds the motor spring, he is inclined, owing to the dimension of the control member 1, to bear the end of his thumb and index between which he grasps this member against the casing, thus causing a slight pull on this member. Since tube 3 is slidably mounted on the end 5 of rod 6, this pull has for effect to move axially control member 1 against spring 11 lessening at the same time the compression of joint 16.

The passage into setting position shown in FIG. 2 takes place by pulling on control member 1, this pull first compressing spring 11 between the bottom of tube 3 and screw 10 and then causing the axial movement of the winding stem.

The device shown in FIG. 3 has the same characteristics as those mentioned for the preceding device. The only modification resides in the fact that this tube is placed freely in button 2, being retained axially between the shoulder 8 and the setting ring 20, the flutes 18 and 19 serve to make these two parts integral in rotation.

The devices shown, in winding position, in FIGS. 1 and 3 show the control member 1 in an axial position corresponding to maximum compression of joint 16. Normally the strength of spring 11 is selected in such a way that in rest position and under atmospheric pressure the bottom of tube 3 be slightly distant from shoulder 12 of rod 7. This arrangement has for its purpose to allow member 1 to move axially towards shoulder 12 when the external pressure increases, for example during under water diving. Thus the fluid tightness of the described devices is proportional to the external pressure.

What is claimed is:

1. A control device for a timepiece mechanism housed in a casing comprising a stem passing through one wall of said casing and movable between two axial positions, one corresponding to winding and the other to setting; a control member; means for rotating said member and said stem; a fluid tight joint axially compressed by said member when said stem is in said winding position, said control member being slidably mounted on said stem; two oppositely acting elastic elements acting on said control member, one of said elements consisting of said fluid tight joint; and a tube integral with said casing and forming an annular housing, said fluid tight joint being secured in said annular housing and projectig outside said tube when said stem is in the setting position.

2. A control device for a timepiece mechanism housed in a casing comprising a stem passing through one wall of said casing and movable between two axial positions, one corresponding to winding and the other to setting; a winding button; means for rotating said button and said stem; a fluid tight joint axially compressed by said button when said stem is in the winding position, said winding button being slidably mounted on said stem; two oppositely acting elastic elements acting on said control member, one of said elements consisting of said fluid tight joint, said button having therein a tube and a housing provided between said tube and the bottom of said button, said winding stem penetrating in said housing, said second elastic element being placed in said hrousing; and flange means fixed on said stem for compressing said second elastic member against the end of said tube.

3. Device according to claim 2, wherein said tube has an opening and a segment of said stem passes through said opening, said opening and said segment being so shaped as to constitute means for rotatably coupling said stem and said control member.

4. Device according to claim 2, wherein said winding stem has a shoulder and said second elastic element presses said tube against said shoulder.

References Cited

UNITED STATES PATENTS

| | | |
|---|---|---|
| 2,202,114 | 5/1940 | Morf. |
| 2,391,803 | 12/1945 | Simon. |
| 2,773,347 | 12/1956 | Froidevaux. |
| 2,867,079 | 1/1959 | Pfisterer. |
| 3,362,153 | 1/1968 | Wenger. |
| 3,362,154 | 1/1968 | Perret. |

FOREIGN PATENTS 207,377  10/1939  Switzerland.

RICHARD B. WILKINSON, Primary Examiner

G. H. MILLER, JR., Assistant Examiner